US012656836B2

(12) United States Patent
Sugiura et al.

(10) Patent No.: US 12,656,836 B2
(45) Date of Patent: Jun. 16, 2026

(54) ELECTRONIC APPARATUS AND CONTROLLING METHOD

(71) Applicant: Lenovo (Singapore) Pte. Ltd., Singapore (SG)

(72) Inventors: Atsuo Sugiura, Kanagawa (JP); Munefumi Nakata, Kanagawa (JP); Makoto Endo, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 245 days.

(21) Appl. No.: 18/395,953

(22) Filed: Dec. 26, 2023

(65) Prior Publication Data

US 2024/0219979 A1 Jul. 4, 2024

(30) Foreign Application Priority Data

Jan. 4, 2023 (JP) ................................ 2023-000172

(51) Int. Cl.
| | |
|---|---|
| *G06F 1/16* | (2006.01) |
| *G06F 1/18* | (2006.01) |
| *G06F 1/24* | (2006.01) |

(52) U.S. Cl.
CPC ............ *G06F 1/1683* (2013.01); *G06F 1/189* (2013.01); *G06F 1/24* (2013.01)

(58) Field of Classification Search
CPC ........... G06F 1/1683; G06F 1/189; G06F 1/24
See application file for complete search history.

(56) References Cited

U.S. PATENT DOCUMENTS

| | | | | |
|---|---|---|---|---|
| 2007/0162737 A1* | 7/2007 | Kao | ........................ | G06F 1/26 |
| | | | | 713/2 |
| 2008/0148082 A1* | 6/2008 | Shen | ........................ | G06F 1/32 |
| | | | | 713/320 |
| 2010/0026099 A1* | 2/2010 | Oguri | ................... | H02J 7/0044 |
| | | | | 307/80 |

FOREIGN PATENT DOCUMENTS

| | | |
|---|---|---|
| CN | 216117959 U | 3/2022 |
| JP | H07-219903 A | 8/1995 |
| JP | 3079786 U | 8/2001 |
| JP | 2002-178610 A | 6/2002 |
| JP | 2006-171868 A | 6/2006 |

* cited by examiner

*Primary Examiner* — Zahid Choudhury
(74) *Attorney, Agent, or Firm* — Osha Bergman Watanabe & Burton LLP

(57) ABSTRACT

A connector is made connectable with a DC power source by using a transmission line. The transmission line has a power source line and a signal line. A switch disconnects a signal line or makes the signal line connectable to a reference potential line. A controller monitors the potential of the signal line, detects reconnection of the signal line on the basis of the potential and then boots a host system.

7 Claims, 7 Drawing Sheets

136 ; AC ADAPTER                           26 ; USB ADAPTER

136 ; AC ADAPTER                           26 ; USB ADAPTER

ELECTRONIC APPARATUS AND CONTROLLING METHOD

CROSS-REFERENCE TO RELATED APPLICATIONS

This application claims priority to Japanese Patent Application No. 2023-000172 filed on Jan. 4, 2023, the contents of which are hereby incorporated herein by reference in their entirety.

BACKGROUND OF THE INVENTION

Field of the Invention

The present invention relates to an electronic apparatus and a controlling method thereof such as, for example, the procedure of booting the electronic apparatus.

Description of the Related Art

In electronic apparatuses, there exists an apparatus which has a chassis which is deformable such that a power source button is exposed when used and is covered when not-used. For example, a laptop personal computer (a laptop PC) includes two sets of chassis. The two sets of chassis are configured such that one chassis is rotationally movable relative to the other chassis with one side of each chassis being set as the axis of rotation. A display is arranged on one chassis and a power source button is arranged on the other chassis. The power source button is covered with one chassis in a state that the two sets of chassis are closed.

There are cases where the electronic apparatus such as the laptop PC and so forth is used in a state of connecting various kinds of input and output devices thereto. The input and output devices to be connected thereto are, for example, an external device, a keyboard, a mouse and so forth. In a case where a user boots the laptop PC by connecting the external input and output devices thereto, it is necessary for the user to open one chassis so as to expose the power source button and then to depress the power source button. Then, the user closes one chassis so as to stop functions of the display which is provided on one chassis. It is troublesome for the user to open and close the chassis every time that the user boots the electronic apparatus so as to make the external display function.

In this respect, it is also conceivable to introduce a docking station so as to connect the laptop PC with various input and output devices in order to boot the laptop PC without operating the chassis. As exemplified in Japanese Unexamined Patent Application Publication No. 1995-219903, the docking station provides an operation environment which is unified among a plurality of devices. Since the docking station is comparatively expensive, there are cases where the docking station is not desired only for the purpose of connecting the input and output devices with the laptop PC. Accordingly, in setting a power source of BIOS (Basic Input/Output System) while operating the laptop PC, it is also conceivable to set "Enabled" in the item of "Power On with AC Attach" when connecting an AC (Alternating Current) adapter. It is further conceivable to boot the laptop PC by connecting the AC adapter which is in a power-on state to the laptop PC which is in a power-source OFF state or by attaching and detaching the AC adapter which has already been connected thereto. Nevertherless, such a request that it is wished to operate the laptop PC in a state of leaving the AC adopter connected thereto still remains.

SUMMARY OF THE INVENTION

The present invention according to the first aspect of the present invention, provides an electronic apparatus which includes a host system, a controller and a connector which is connectable with a DC power source by using a transmission line, in which the transmission line has a power source line and a signal line and includes a switch which disconnects the signal line or makes the signal line connectable to a reference potential line and the controller monitors the potential of the signal line and detects reconnection of the signal line on the basis of the potential and, then boots the host system.

In the electronic apparatus, the controller may detect temporal disconnection of the signal on the basis of the potential of the signal line and then may restart power supply to the DC power source.

In the electronic apparatus, the controller may detect connection of the signal line on the basis of the potential of the signal line and may detect a power outage on the basis of the potential of the DC power supply and, then may make the DC power source restart the power supply.

In the electronic apparatus, the transmission line may include a first transmission line and a second transmission line, one end of the first transmission line may be connected to the DC power source, the other end of the first transmission line may be made connectable to one end of the second transmission line, the other end of the second transmission line may be made connectable to the connector and the second transmission line may include the switch.

In the electronic apparatus according, the signal line may include a first signal line and a second signal line, the switch may disconnect the first signal line and the second signal line or may make the first signal line and the second signal line connectable to the reference potential line, the controller may monitor potentials of the first signal line and the second signal line and may decide whether either one of the first signal line and the second signal line is reconnected on the basis of the potentials.

In the electronic apparatus, one end of the second transmission line may include a first connector which fits together with the other end of the first transmission line, the other end of the second transmission line may include a second connector which fits together with the connector, and each of the first connector and the second connector may include a first terminal which terminates the first signal line and a second terminal which terminates the second signal line at rotationally symmetric positions.

A controlling method according to the second aspect of the present invention is a controlling method in an electronic apparatus which includes a host system, a controller and a connector which is made connectable with a DC power source by using a transmission line which has a power source line and a signal line and includes a switch which disconnects the signal line or makes the signal line connectable to a reference potential line. The electronic apparatus monitors the potential of the signal line and detects reconnection of the signal line on the basis of the potential, and thereby boots the host system.

According to one or more embodiments of the present invention, it becomes possible to boot the electronic apparatus conveniently and economically.

3

DETAILED DESCRIPTION OF THE INVENTION

In the following, one or more embodiments of the present invention will be described with reference to the drawings. First, an outline of an electronic apparatus 1 according to one or more embodiments will be described.

The electronic apparatus 1 includes a host system, a controller and a connector which is connectable with a DC power source by using a transmission line. The transmission line has a power source line and signal lines and is connected to a switch which disconnects each signal line or makes the signal line connectable to a reference potential line. The controller monitors the potential of each signal line, detects a connection state of the signal line on the basis of the potential which is monitored and boots the host system in a case where power supply from the DC power source is cut off and thereafter the power supply is restarted.

In the following description, a case where the electronic apparatus 1 is a laptop PC and the transmission line is a USB (Universal Serial Bus) type-C cable will be mainly explained. The USB type-C is one of representative standards of input/output equipment and transmission lines.

Figure 1:
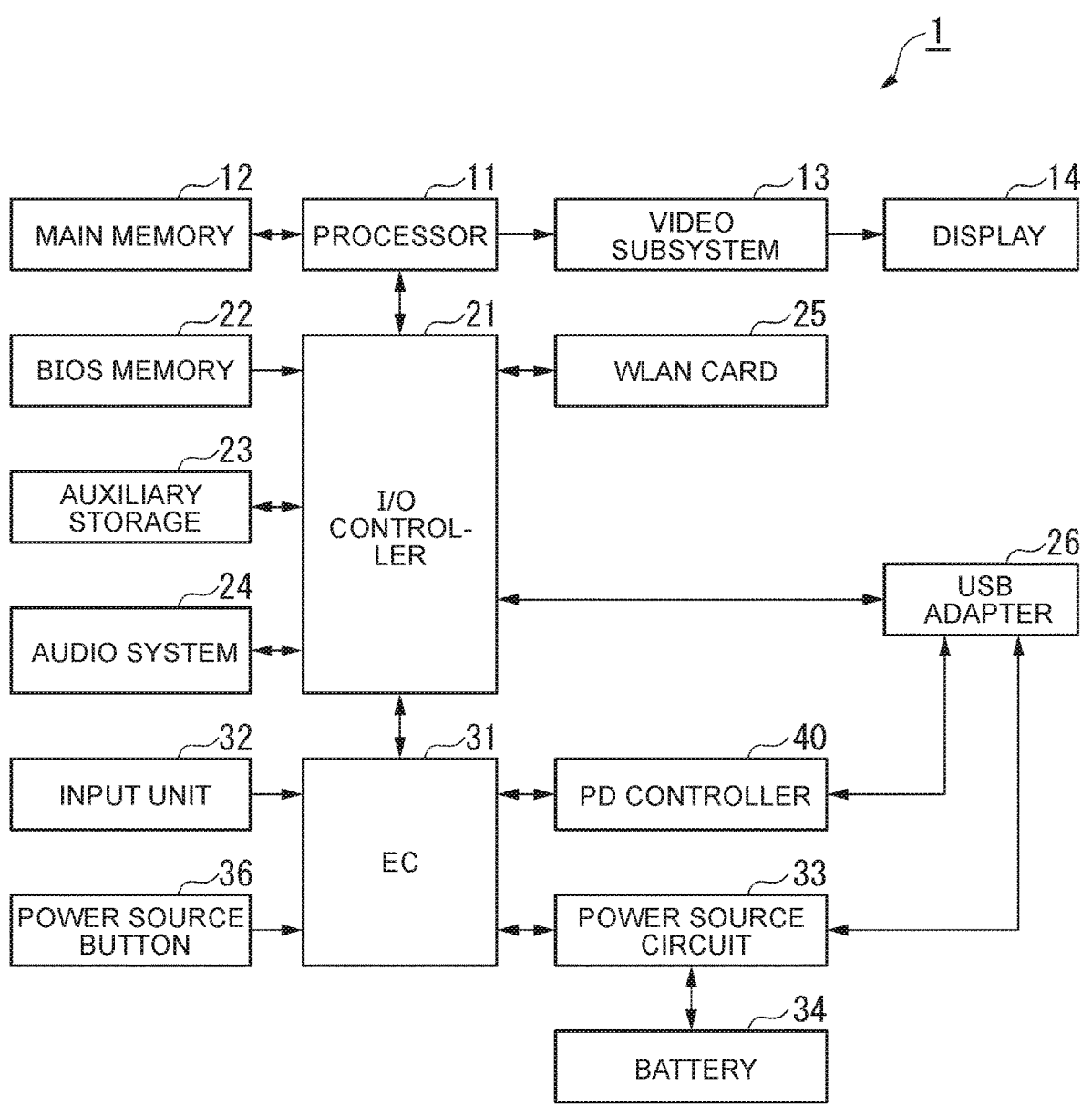
FIG. 1 is a schematic block diagram illustrating one example of a hardware configuration of an electronic apparatus according to one or more embodiments of the present invention.

FIG. 1 is a schematic block diagram illustrating one example of a hardware configuration of the electronic apparatus 1 according to one or more embodiments of the present invention. The electronic apparatus 1 includes a processor 11, a main memory 12, a video subsystem 13, a display 14, an IO controller 21, a BIOS memory 22, an auxiliary storage 23, an audio system 24, a WLAN card 25, a USB adapter 26, an EC 31, an input unit 32, a power source circuit 33, a battery 34, a power source button 36 and a PD controller 40.

The processor 11 executes various kinds of arithmetic processing which are directed by commands which are described in various kinds of software (programs). At least one CPU is included in the processor 11. The CPU controls the entire operation of the electronic apparatus 1. The CPU executes processing which is based on software such as, for example, OS (Operating System), BIOS), an application program (which is also called "App" in some cases and so forth in the description of the present invention). Incidentally, execution of processing which is instructed on the basis of a command which is described in software is sometimes called to "execute software".

The main memory 12 is a writable memory which is utilized as a loading area of an execution program of the processor 11 or as a working area into which processed data on the execution program is written. The main memory 12 is configured by, for example, a plurality of DRAM (Dynamic Random Access Memory) chips. The OS, various drivers for operating hardware such as peripherals and so forth, various services/utilities, applications and so forth are contained in the execution program. The processor 11 and the main memory 12 are minimal hardware which configures a main computer system (that is, a host system) of the electronic apparatus 1.

The video subsystem 13 is a subsystem for realizing functions which relate to image display and includes a video controller. The video controller processes drawing instructions which are issued from the processor 11, writes processed drawing information into a video memory and reads out the drawing information from within the video memory and then outputs the drawing information as display data which indicates display information to the display 14. The video subsystem 13 may be also configured by including one or a plurality of GPU (s) (Graphic Processing Unit (s)).

The display 14 displays a display screen which is based on drawing data (the display data) which is output from the video controller of the video subsystem 13. The display 14 may be any one of, for example, an LCD (Liquid Crystal Display), an OLED (Organic Light Emitting Diode) display and so forth.

The I/O controller 21 includes a plurality of controllers and is made connectable with a plurality of devices so as to make it possible to input and output various data. The controller corresponds to any one of bus controllers for buses such as, for example, a USB (Universal Serial Bus)-based bus, a serial ATA (Advanced Technology Attachment)-based bus, an SPI (Serial Peripheral Interface)-based bus, a PCI (Peripheral Component Interconnect)-based bus, a PCI-Express-based bus, an LPC (Low Pin Count)-based bus or a combination of them. As the plurality of devices, for example, the BIOS memory 22, the auxiliary storage 23, the audio system 24, the WLAN card 25, the USB adapter 26 and the EC 31 which will be described later are included as the plurality of devices.

The BIOS memory 22 is configured by an electrically rewritable nonvolatile memory such as, for example, an EEPROM (Electrically Erasable Programmable Read Only Memory), a flash ROM. The BIOS memory 22 stores system firmware such as the BIOS, firmware for controlling operations of the EC 31 and other devices and so forth.

The auxiliary storage 23 is configured by an electrically rewritable nonvolatile memory. The auxiliary storage 23 stores various kinds of data which are used for processing the processor 11 and other devices or various kinds of data which are acquired by processing these devices, various programs and so forth. The auxiliary storage 23 may be any one of, for example, an SSD (Solid State Drive), an HDD (Hard Disk Drive) and so forth or a combination of some of them.

The audio system 24 records, regenerates and outputs voice data with a microphone and a loudspeaker (not illustrated) being connected thereto. Incidentally, the microphone and the loudspeaker may be either built in, for example, the electronic apparatus 1 or may be installed separately from the electronic apparatus 1.

The WLAN (Wireless Local Area Network, wireless LAN) card 25 is connected to the wireless LAN and is used for data communication with another apparatus which is directly or indirectly connected to the wireless LAN. The wireless LAN makes it possible to send and receive various data between apparatuses in accordance with a predetermined wireless communication system (for example, IEEE 802.11). Over the wireless LAN, inter-apparatus communication is executed via an access point. The access point is an apparatus in the wireless LAN which is configured by including its own station or a base station which is connected with another network so as to make it possible to transmit and receive data.

The USB adapter 26 includes a connector 26c (which will be described later) for electrically connecting various devices (in the present invention, sometimes called "external devices") which each has a communication function (in the present invention, sometimes called a "USB communication function") which is based the USB standard. The connector 26c is, for example, a USB-C connector which conforms to the USB-C standard. The connector 26c includes a terminal which terminates the USB in its own device and has a form which makes fitting possible so as to be electrically connected with a separately installed USB connector. The separately installed USB connector has a form which terminates the other end of the USB-C cable and makes fitting with the connector 26c possible.

The USB-C cable is a transmission line which includes a power line and a signal line and is configured by bundling these lines in bulk. Terminals that individual USB-C cables include terminate the power line and the signal line respectively and constitute part of the transmission path. Accordingly, the USB adapter 26 makes it possible to transmit and receive various data by using the transmission line between it and the external device thereby to realize a USB communication function and makes it possible to transmit and receive the electric power.

The USB adapter 26 is physically connected to the IO controller 21, the power source circuit 33 and the PD controller 40 which configure the electronic apparatus 1. The USB adapter 26 connects the power source circuit 33 and the external device together so as to make electric power transmission and reception possible between the power source circuit 33 and the external device regardless of the operation state of the host system of the electronic apparatus 1. The USB adapter 26 is so connected as to make data transmission and reception possible between itself and each of the IO controller 21 and the PD controller 40. Also, an AC adapter 136 (described later) is possibly included in an external apparatus which is connectable to the electronic apparatus 1. The AC adapter 136 converts AC electric power which is supplied from an external power source to DC electric power that the voltage becomes constant and supplies the electric power which is so converted to the USB adapter 26. Control signals may be input into and output from the AC adapter 136 between itself and the USB adapter 26 other than the electric power. Control signal input and output are executed in accordance with a predetermined standard. As the predetermined standard, it is possible to use, for example, the USB Type-C.

The EC (Embedded Controller) 31 is a one-chip microcomputer which monitors and controls various devices (such as the peripherals, the sensors and so forth) regardless of the operation state of the host system of the electronic apparatus 1. The EC 31 includes a CPU, a ROM, a RAM, A/D (Analog-to-Digital) input terminals for a plurality of channels, D/A (Digital-to-Analog) output terminals, timers and digital input and output terminals (not illustrated) separately from the processor 11. For example, the input unit 32, the power source circuit 33, the PD controller 40 and so forth are connected to digital input and output terminals of the EC 31 and the EC 31 controls operations of them.

The input unit 32 includes an input element which detects a user's operation and outputs an operation signal which corresponds to the detected operation to the EC 31. The input unit 32 includes, for example, a keyboard, a touch pad and so forth. A touch sensor which constitutes the input unit 32 overlaps with the display 14 integrally and thereby may be configured as a touch panel.

The power source circuit 33 converts the voltage of DC electric power which is supplied from the USB adapter 26 or the battery 34 to a voltage which is required for the operation of each device which constitutes the electronic apparatus 1 and supplies electric power which has the converted voltage to each supply destination device. The power source circuit 33 executes the power supply in accordance with control from the EC 31. The power source circuit 33 includes a DC/DC (Direct) converter which converts the voltage of electric power which is supplied to itself and an electric power feeder which supplies voltage-converted electric power to the battery 34. In a case where the electric power is supplied from the USB adapter 26, the power feeder supplies the electric power which is remained in each device without being consumed to the battery 34. In a case where the electric power is not supplied from the USB adapter 26 or in a case where the electric power which is supplied from the USB adapter 26 is insufficient, the power feeder supplies the electric power which is discharged from the battery 34 to each device by using a DC/DC converter as operating electric power.

As the battery 34, a secondary cell is used. The secondary cell is a chargeable and dischargeable storage battery. The secondary cell is, for example, a lithium-ion cell.

Every time a depressing operation is accepted, the power source button 36 controls to enter either Power ON or Power OFF as a state of supplying the electric power to the entire of the electronic apparatus 1. In a case where the depressing operation is accepted, the power source button 36 controls to output a depressing signal which indicates the depressing operation to the EC 31. In a case where the electronic apparatus 1 is in the Power OFF state and a depression signal is input from the power source button 36, the EC 31 makes the power source circuit 33 start power supply to each device of the electronic apparatus 1 (Power ON). In a case where the processor 11 detects start of power supply to its own, the processor 11 reads BIOS out of the BIOS memory 22, loads the BIOS to the main memory 12 and executes a booting process in accordance with various commands which are described in the BIOS. In the booting process, the processor 11 loads data which is retreated to the auxiliary storage 23 to the main memory 12. Then, the processor 11 boots the OS and starts execution of a device driver which relates to control of devices such as the auxiliary storage 23 and so forth after completion of booting of the OS (the booting process).

On the other hand, in a case where the electronic apparatus 1 is powered up and the depression signal is input from the power source button 36, the EC 31 makes the processor 11 execute a shut-down process. In the shut-down process, the processor 11 migrates data which is present in a work area at that time point to the auxiliary storage 23 and other auxiliary storages. After completion of migration of the data, the processor 11 stops a process which is being executed at that time point on the basis of an application, a device driver for the auxiliary storage 23 and so forth and/or other programs (a stopping process). Thereafter, the processor 11 notifies the EC 31 of completion of execution of the stopping process. The EC 31 makes the power source circuit 33 stop power supply to each device of the electronic apparatus 1.

The PD (Power Delivery) controller 40 detects a connection state between the USB adapter 26 and an external device and controls power transmission and reception between the USB adapter 26 and the external device in accordance with a detected connection state. In addition, the PD controller 40 notifies the EC 31 of the detected connection state.

Figure 2:
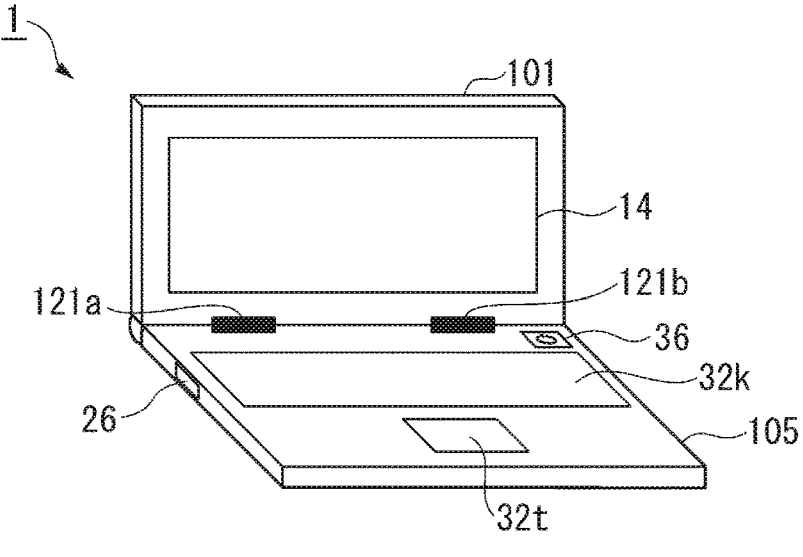
FIG. 2 is a perspective view illustrating one example of an external configuration of the electronic apparatus according to one or more embodiments of the present invention.

Next, an example of an external configuration of the electronic apparatus 1 according to one or more embodiments of the present invention will be described. FIG. 2 is the perspective view illustrating one example of the external configuration of the electronic apparatus 1 according to one or more embodiments of the present invention. The electronic apparatus 1 includes a first chassis 101 and a second chassis 105 and the first chassis 101 and the second chassis 102 are combined together by using hinge mechanisms 121a and 121b. The hinge mechanisms 121a and 121b are fixed to one side of the first chassis 101 and one side of the second chassis 105 respectively. One of the first chassis 101 and the second chassis 105 is made rotationally movable relative to the other with one side of each of the first chassis 101 and the second chassis 105 being set as an axis of rotation. That is, an angle θ (in the present invention, called an "aperture angle") between a principal plane of the first chassis 101 and a principal plane of the second chassis 105 becomes variable.

The display is 14 is arranged on the principal plane of the first chassis 101 and occupies most of the principal plane. A keyboard 32k, a touch pad 32t and a power source button 36 are arranged on the principal plane of the second chassis 105. Owing to such arrangement, the electronic apparatus 1 is used in a state that the first chassis 101 and the second chassis 105 are left open. The left-open state is a state that one of the principal planes of the first chassis 101 and the second chassis 105 is opened without being shielded by the other principal plane. In the left-open state, the aperture angle θ typically falls within a range from 90° to 180°. In the left-open state, the power source button 36 is exposed to the outside without being shielded by the second chassis 105. In a closed state, the power source button 36 is shielded by the second chassis 105 and is not depressed. There are cases where the EC 31 detects that the first chassis 101 and the second chassis 105 turn from a mutually opened state to a mutually closed state and turns the operation state of the host system which is being operated in the left-open state to a state which is lower in power consumption (that is, a sleep state) or stops the operation of the host system. Incidentally, the USB adapter 26 is attached to a side face of the second chassis 105. The USB adapter 26 is exposed to the outside regardless of the opened and closed states between the first chassis 101 and the second chassis 105 and therefore attachment/detachment of the USB adapter 26 to/from other apparatuses which are performed by using a transmission line is facilitated.

The electronic apparatus 1 according to one or more embodiments realizes power-on in a closed state without bringing the first chassis 101 and the second chassis 105 into mutually opened states. Accordingly, in power setting of the BIOS, the item "Power On with AC Attach" is set to "Enabled" in advance. Owing to this setting, in a case where the CPU 11 detects the electric power which is supplied to itself, the CPU 11 starts execution of the booting process of the host system. On the other hand, in a case where the PD controller 40 detects connection with an AC adapter 136 which serves as the DC power source, the PD controller 40 receives power supply from the AC adapter 136 and makes the AC adapter 136 supply the electric power which is supplied to the CPU 11 via the power source circuit 33.

In addition, in one or more embodiments of the present invention, a switch BS which disconnects a CC signal line (Configuration Channel line) which constitutes the transmission line UC or makes the CC signal line connectable to a reference potential line in accordance with the operation is installed on a transmission line UC which electrically connects the electronic apparatus 1 and the AC adapter 136 together. Thereby, it becomes possible to boot the host system with ease with no need of connection or attachment/detachment of the AC adapter 136.

Figure 3:
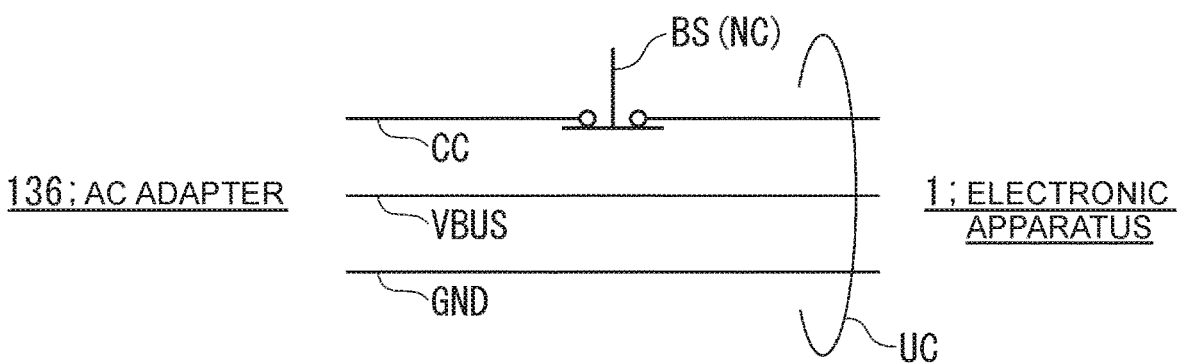
FIG. 3 is a diagram illustrating the first arrangement example of a switch pertaining to one or more embodiments of the present invention.

Next, examples of the transmission line US and the switch BS which are used for connection between the electronic apparatus 1 and the AC adapter 136 will be described. In the following, a case where the transmission line UC is a USB-C cable will be mainly described. FIG. 3 is a diagram illustrating the first arrangement example of the switch BS pertaining to one or more embodiments of the present invention. The transmission line UC electrically connects the electronic apparatus 1 and the AC adapter 136 together. The transmission line UC includes a signal line and a power source line VBUS. The signal line includes the CC signal line and an USB signal line. The CC signal line is used mainly for transmission of electric power transmission and reception control information. The USB signal line is used for transmission of various data between the electronic apparatus 1 and a destination apparatus which serves as a connection destination. The power source line is used for power supply from the power source (source) to a load (sink).

In the example in FIG. 3, the transmission line UC includes the CC signal line, a USB power source line VBUS and a reference potential line GND. The CC signal line is divided into parts in the middle, one part of the CC signal line is connected to the USB adapter 26 of the electronic apparatus 1 and the other part of the CC signal line is connected to the AC adapter 136. The switch BS is so installed as to engage one part of the CC signal line with the other part thereof. The switch BS includes a button and a section. One end of the button accepts a depressing operation which is performed thereon and makes the section which is supported to the other end move. The section is configured by a conductor. In a state that the button is not depressed and is released, one end of the section is short-circuited to one part of the CC signal line and the other end of the section is short-circuited to the other part of the CC signal line. Since one part and the other part of the CC signal line are closed, the CC signal line enters an electrically connected state as a whole (NC: Normally Closed Type). In a state that the button is depressed, the section breaks away from the CC signal line. Since one part and the other part of the CC signal are opened, the CC signal line enters an electrically insulated state as a whole.

Figure 5:
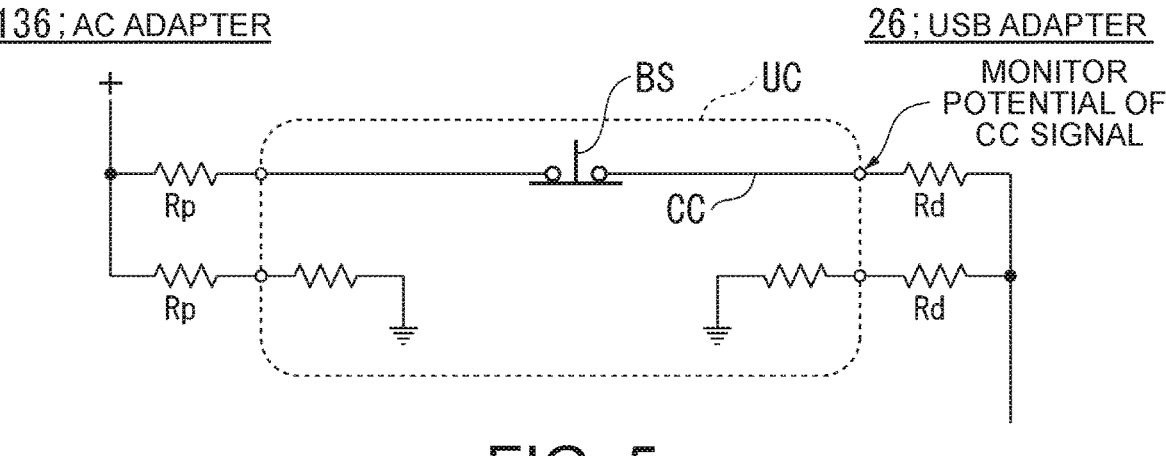
FIG. 5 is a diagram illustrating one example of a connection state of a CC signal line between the electronic apparatus according to one or more embodiments of the present invention and an AC adapter.

FIG. 5 is a diagram illustrating one example of a CC signal line connection state between the electronic apparatus 1 and the AC adapter 136. In the example in FIG. 5, the AC adapter 136 and the USB adapter 26 that the electronic apparatus 1 includes function as a power source and a load respectively. A predetermined power source voltage is applied to one end of the CC signal line by the AC adapter 136 via a pull-up resistor Rp. The other end of the CC signal line is connected to a reference potential line GND which applies a reference potential (that is, 0V) via a pull-down resistor Rd by the USB adapter 26. Accordingly, in a state that the button is not depressed, the potential of the CC signal line is maintained at a fixed positive potential which is significantly higher than 0V. In a state that the button is depressed, the potential of the CC signal line becomes lower than a predetermined potential significantly and becomes equal to the reference potential.

Accordingly, the PD controller 40 monitors the potential at a terminal of the CC signal line of the USB adapter 26. In a case where the potential that the PD controller 40 monitors becomes significantly lower than the potential of the predetermined CC signal (for example, 0V), the PD controller 40 detects disconnection of the CC signal line. At that time, the controller 40 stops power supply from the AC adapter 136 to the power source circuit 33. In a case where the potential that the PD controller 40 monitors is recovered in excess of a predetermined potential and that state is maintained for a time which exceeds a predetermined duration time, it becomes possible for the PD controller 40 to detect connection of the CC signal line. At that time, the PD controller 40 starts power supply from the AC adapter 136 to the power source circuit 33. It becomes possible for the CPU 11 to detect supply of DC electric power and to start the booting process.

Figure 6:
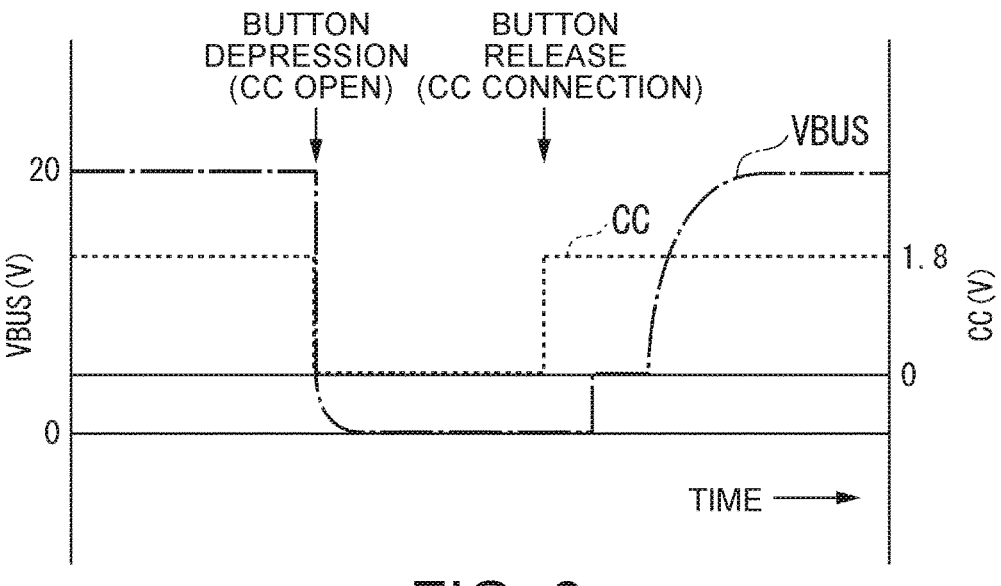
FIG. 6 is a diagram illustrating one example of time-dependent changes of potentials of the CC signal line and a power source line.

FIG. 6 illustrates time-dependent changes of the potentials of the CC signal line and the power source line VBUS by button depression of the switch BS which is illustrated in FIG. 3. In the example in FIG. 6, at first, the potential of the CC signal line and the potential of the power source line VBUS are 1.8V and 20V respectively. In a button depression duration, the CC signal line is opened and therefore the potential of the CC signal line is lowered to 0V. At that time, the PD controller 40 detects disconnection of the CC signal line and stops power supply to the power source circuit 33. The potential of the power source line VBUS is lowered to 0V. In a case where depression of the button is released, the potential of the CC signal line returns to 1.8 V which is the initial value. At that time, the PD controller 40 detects connection of the CC signal line and restarts power supply to the power source circuit 33. The potential of the power source line VBUS which is obtained at the beginning of restart of power supply indicates an initial value (5.0 V in the example in FIG. 6) which is regulated in the USB Type-C. Thereafter, the PD controller 40 determines the voltage which is to be supplied to the electronic apparatus 1 as a requested voltage on the basis of power consumption which is set in advance in its own device or power consumption which is notified from the EC 31 and transmits requested voltage information which indicates the requested voltage which is determined to the AC adapter 136. The AC adapter 136 starts supply of the electric power which has the required voltage which is instructed in the required voltage information. In accordance therewith, the potential of the power source line VBUS changes from a potential which corresponds to the initial value 5V to a potential which corresponds to the required voltage 20V.

Figure 4:
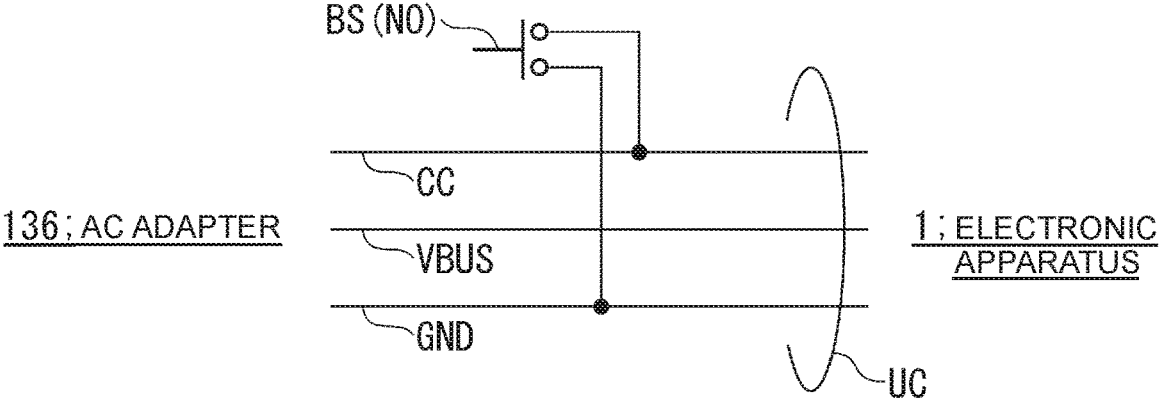
FIG. 4 is a diagram illustrating the second arrangement example of the switch pertaining to one or more embodiments of the present invention.

FIG. 4 is a diagram illustrating the second arrangement example of the switch BS pertaining to one or more embodiments of the present invention. In the example in FIG. 4, the switch BS includes a button, a section and two terminals. One terminal is electrically connected to the CC signal line and the other terminal is connected to the reference potential line GND. In a state that the button is not depressed and is released, the section and two terminals are mutually insulated and a difference in potential between the CC signal line and the reference potential line is maintained (NC: Normally Open Type). In a state that the button is depressed, one end of the section comes into contact with one terminal and the other end of the section comes into contact with the other terminal, and therefore, the potential of the CC signal line becomes equal to the reference potential. Therefore, the CC signal line is not allowed to transmit an effective electric signal.

Figure 7:
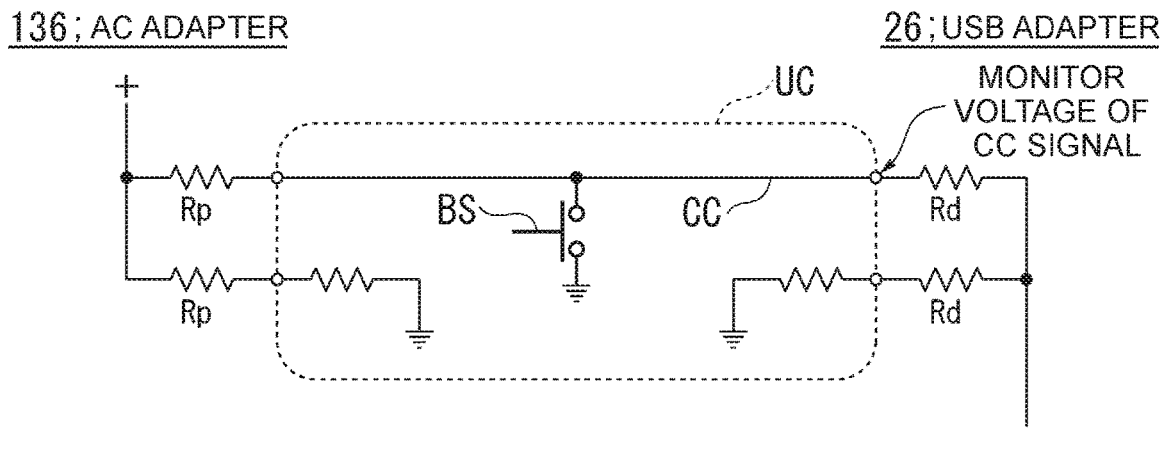
FIG. 7 is a diagram illustrating another example of the connection state of the CC signal line between the electronic apparatus according to one or more embodiments of the present invention and the AC adapter.

FIG. 7 is a diagram illustrating one example of the connection state of the CC signal between the electronic apparatus 1 and the AC adapter 136. In the example in FIG. 7, in a state that the button of the switch BS is not depressed, a difference in potential between the CC signal line and the reference potential line GND is maintained almost constant. In a button depressed state, the potential of the CC signal line becomes lower than a predetermined potential significantly and is lowered to 0V.

Figure 8:
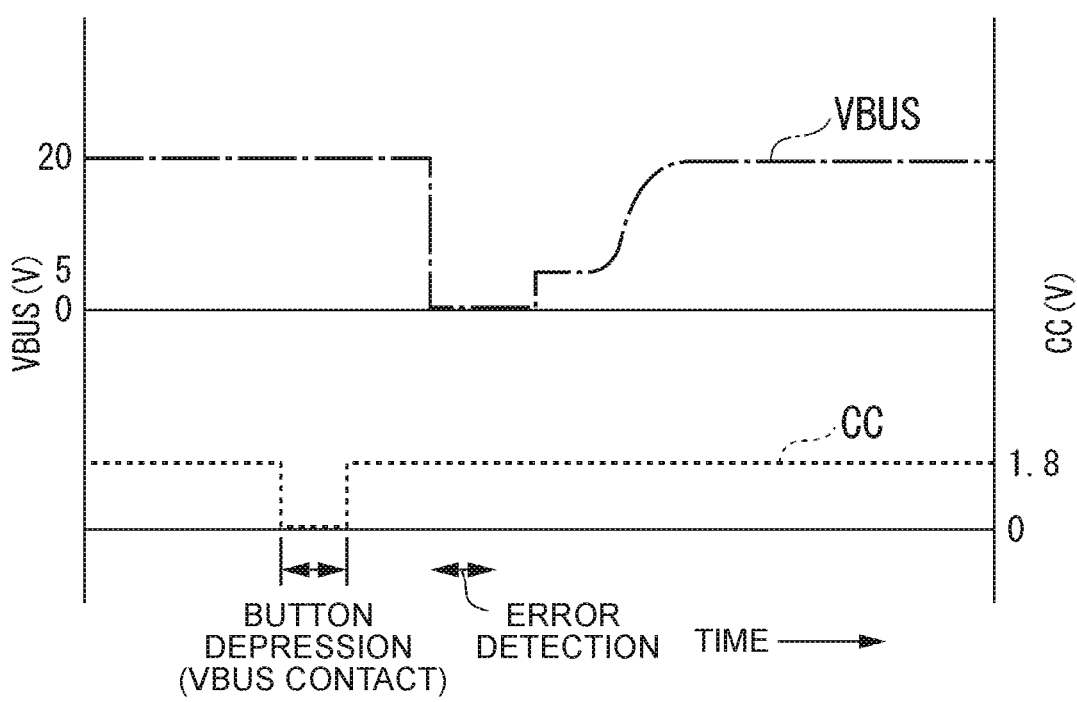
FIG. 8 is a diagram illustrating another example of the time-dependent changes of the potentials of the CC signal line and the power source line.

FIG. 8 illustrates one example of time-dependent changes of the potentials of the CC signal line and the power source line VBUS which are induced by button depression of the switch BS which is illustrated in FIG. 4. In the example in FIG. 8, initially, the potential of the CC signal line and the potential of the power source line VBUS are 1.8 V and 20 V respectively. Since the CC signal line electrically comes into contact with the reference potential line GND in a button depressed period, the potential of the CC signal line is lowered to 0V. On the other hand, the potential of the power source line VBUS is maintained at 20V. The PD controller 40 decides presence/absence of abnormalities in a relation between the potential of the power source line VBUS and the potential of the CC signal line. In this case, although the potential of the power source line VBUS falls within a range of values which would be taken upon power supply, the potential of the CC signal line may be possibly lowered to 0V which would not been obtained at the time of communication via the CC signal line. Therefore, the PD controller 40 executes abnormality judgment (error detection). In this case, the PD controller 40 stops power supply to the power source circuit 33. In this case, the potential of the power source line VBUS is lowered to 0V. In a case where button depression is released, the potential of the CC signal line returns to 1.8 V which is originally set.

Then, the PD controller 40 restarts power supply to the power source circuit 33. The potential of the power source line VBUS which is obtained at restart of power supply indicates 5.0 V (the initial value). Then, the PD controller 40 determines the required voltage in accordance with the power consumption which is set in advance in the PD controller 40 itself or power consumption which is informed of from the EC 31 and transmits required voltage information which indicates the required voltage which is determined to the AC adapter 136. The AC adapter 136 starts supply of power which has the required voltage which is instructed in the required voltage information. In accordance therewith, the potential of the power source line VBUS changes from 5V (the initial value) to 20V which corresponds to the required voltage.

Figure 9:
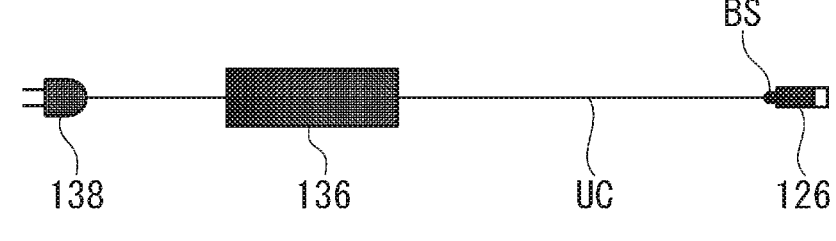
FIG. 9 is a diagram illustrating one arrangement example of the switch on a transmission path pertaining to one or more embodiments of the present invention.

Although in the examples in FIG. 3 to FIG. 5 and FIG. 7, the switch BS is installed on an almost central part of the transmission line UC, the position of the switch BS is not limited to this part as long as it is a position which makes it possible to switch between disconnection of the CC signal line or presence/absence of connection with the reference potential line. As illustrated in FIG. 9, the switch BS may be also annexed to the connector 126 which is installed at one end of the transmission line US. The AC adapter 136 is connected to the other end of the transmission line UC. The AC adapter 136 converts AC power which is supplied from an external power source 138 to DC power and sends the DC power to the transmission line UC.

Although, in the above example, a case where the number of the transmission lines between the AC adapter 136 and the USB adapter 26 is one is mainly described, the number of the transmission lines is not limited to one. A plurality of transmission lines may be serially connected together and thereby a transmission line which is electrically one system may be formed between the AC adapter 136 and the USB adapter 26. Connectors X and Y may be installed at one end of one transmission line and at the other end of the other transmission line and the connectors X and Y may have forms which allow mutual fitting. For example, one connector X includes a protruded terminal (a plug) and the other connector Y includes a recessed terminal (a receptacle). The switch BS may be installed on at least any one of the transmission lines in the plurality of transmission lines.

Figure 10:
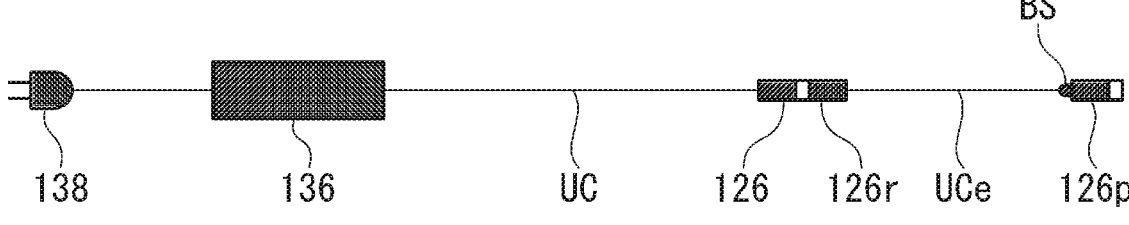
FIG. 10 is a diagram illustrating another arrangement example of the switch on the transmission path pertaining to one or more embodiments of the present invention.

In the example in FIG. 10, the transmission line UC and an extension line (an extension cable) Uce are serially connected to the AC adapter 136. One end and the other end of the transmission line UC are connected to one end of the AC adapter 136 and one end of the extension line UCe respectively. Connectors 126 and 126r are installed on the other end of the transmission line UC and one end of the extension line UCe respectively. The connectors 126 and 126r have a protruded terminal and a recessed terminal respectively. A connector 126p is installed at the other end of the extension line UCe. The connector 126p has a protruded terminal. A switch BS is attached to the connector 126p.

Each of the connectors 126, 126r, 126p and 26c has a plurality of terminals. The individual terminals terminate lines which correspond to the terminals respectively. In the example in FIG. 11, each of the connectors 126, 126r, 126p and 26c has 24 terminals in conformity to the USB Type-C respectively. The 24 terminals are juxtaposed in two lines on terminated surfaces of the respective connectors. The number of the terminals on each line is 12. 12 different kinds of lines are connected line by line.

Figure 11:
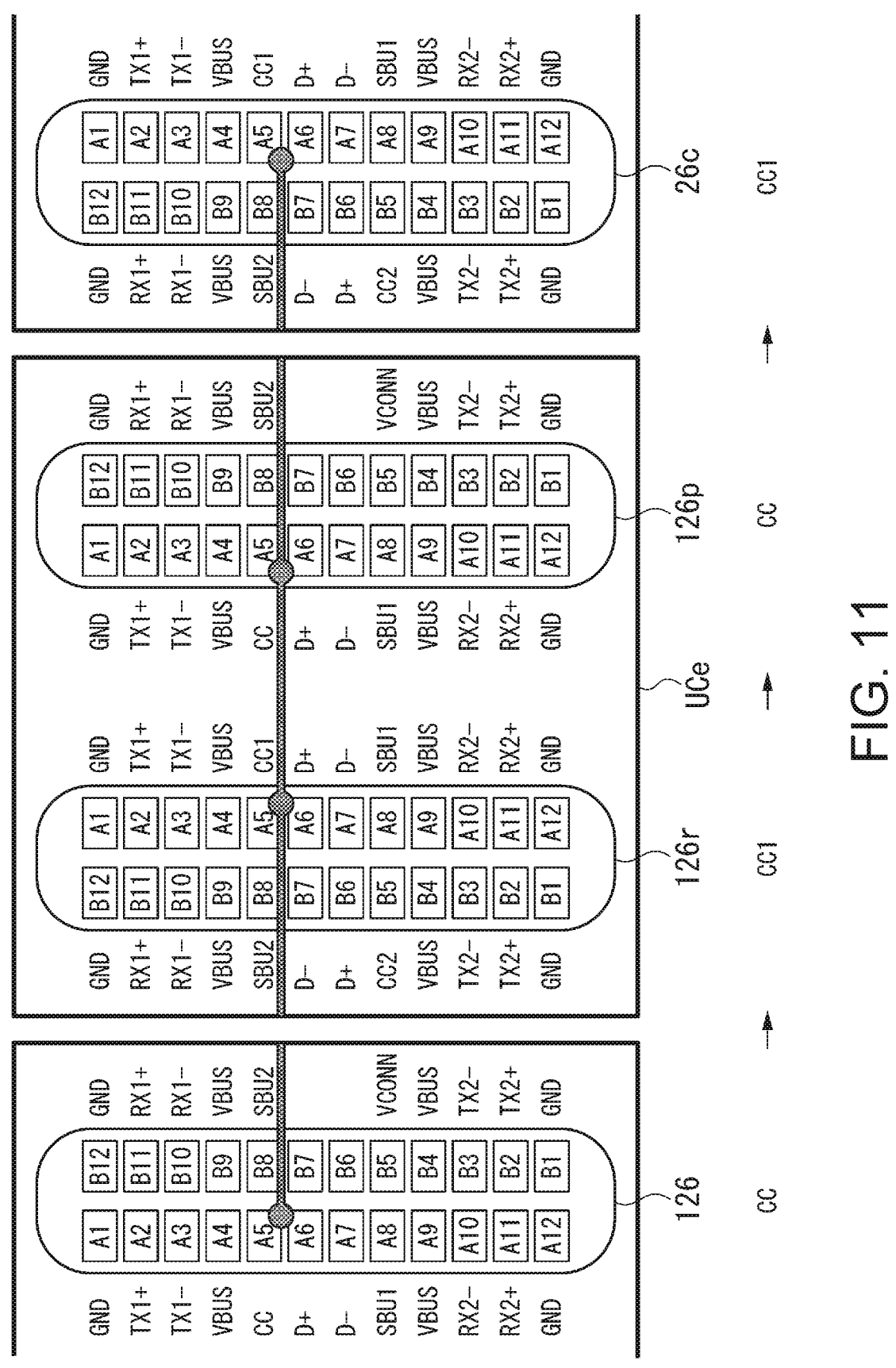
FIG. 11 is a diagram illustrating one connection example of signal lines pertaining to one or more embodiments of the present invention.

In the example in FIG. 11, respect terminals of GND, TX1+, TX1−, VBUS, CC, D+, D−, SBU1, VBUS, RX2−, RX2+ and GND are arrayed in this order on the first line of the connector 126 as terminals A1 to A12. In these terminals, two terminals GND indicate a reference potential line or a terminal thereof respectively. A pair of TX1+ and TX1− indicates signal lines which are used for signal transmission which is based on regulations which follow USB 3.0 or terminals of the signal lines. Two marks VBUS indicate power source lines or terminals thereof respectively. CC indicates a CC signal line or a terminal thereof. A pair of RX2− and RX2+ indicates signals lines which are used for signal reception which is based on the regulations which follow the USB 3.0 or terminals thereof. A pair of D+ and D− indicates signal lines which are used for transmission of various signals which are based on the regulations which have been established before USB 2.0 or terminals thereof. SBU 1 indicates a spare line or a terminal thereof.

Various kinds of lines which are one by one allocated to respective terminals which are arrayed on the second line of the connector 126 are arrayed in order which is almost opposite to the order of terminals of the first line in a longitudinal direction of the connector 126. Respective terminals of GND, TX2+, TX2−, VBUS, VCONN, SBU2, VBUS, RX1−, RX1+ and GND are arrayed in this order as terminals B1 to B12 on the second line of the connector 126. However, lines are not allocated to central two terminals. VCONN is one of power source lines of a USB Type-C cable. VCONN indicates a line which sets power supply to various electronic circuits which are incidental to the USB Type-C cable as a main object or a terminal of the line. However, the USB Type-C cable has two CC signal lines and one of them is used as VCONN and the other is used for transmission of control information as the CC signal line. Terminals (CC and VCONN) which pertain to two CC signal lines have a mutually rotationally symmetric positional relation on a terminated surface of the connector 126.

The arrangement of the terminals of the connector 126r is roughly symmetrical to the arrangement of the terminals of the connector 126. That is, the terminals on the first and second lines of the connector 126r are the same as the terminals on the second and first lines of the connector 126. However, D+ and D− are allocated to central parts of also the first line of the connector 126r and the order of D+ and D− on the first line is reversed to the order of D+ and D− on the second line. CC2 and CC1 are allocated to the connector 126r on the first line and the second line in place of VCONN and CC. Also, on the terminated surface of the connector 126p, terminals which relate to two CC signal lines CC1 and CC2 have a mutually rotationally symmetric positional relation.

Incidentally, the arrangement of the terminals of the connector 126p is the same as the arrangement of the terminals of the connector 126. The arrangement of the terminals of the connector 26c is the same as the arrangement of the terminals of the connector 126r. Rotational symmetry of the arrangement of the terminals is maintained in order to cope with the possibility that one connector and the other connector would be connected in mutually opposite directions. It sometimes occurs that the direction that the connectors 126 and 126r are connected is reversed unintentionally by attachment and detachment.

In the example in FIG. 11, the first line and the second line of the connector 126 are connected to the second line and the first line of the connector 126r respectively without changing an orientation in a longitudinal direction. The CC terminal of the connector 126 is connected to the CC1 terminal of the connector 126r and is eventually connected to the CC terminal of the CC terminal of the connector 126p. The first line and the second line of the connector 126p are connected to the second line and the first line of the connector 126r respectively without changing the orientation in the longitudinal direction. The CC terminal of the connector 126p is connected to the CC1 terminal of the connector 26c.

Figure 12:
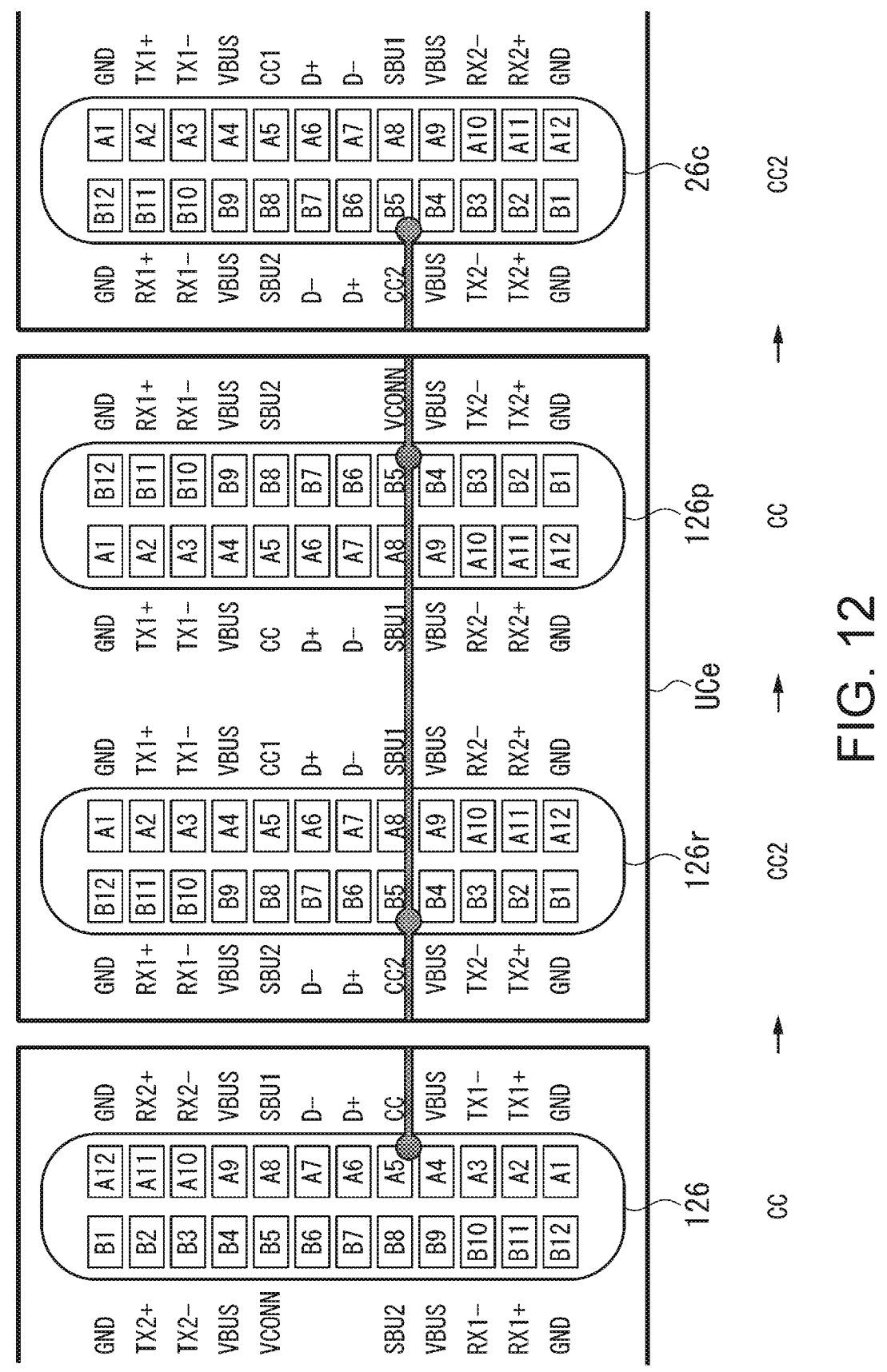
FIG. 12 is a diagram illustrating another connection example of the signal lines pertaining to one or more embodiments of the present invention.

In the example in FIG. 12, the second line and the first line of the connector 126 are connected to the first line and the second line of the connector 126r respectively by reversing the orientation. The CC terminal of the connector 126 is connected to the CC2 terminal of the connector 126r and is electrically connected to the VCONN terminal of the connector 126p eventually. The first line and the second line of the connector 126p are connected to the second line and the first line of the connector 126r respectively. The VCONN terminal of the connector 126p is electrically connected to the CC2 terminal of the connector 26c.

Although there is the possibility that the orientations of the connector 126 and 126r would be reversed by attachment and detachment, the electric signal which is output from the connector 126 and is transferred to the CC signal line is transferred to either one of CC1 and CC2 of the connector 26c.

In a case where the PD controller 40 monitors the voltage of each of the CC1 signal line and the CC2 signal line and detects a significant voltage drop of either one of them, the PD controller 40 instructs power supply to the AC adapter 136. However, whether voltage change occurs due to the operation of the switches BS of the CC1 signal line and the CC2 signal line depends on the orientations of the connectors 126 and 126r and therefore is not known in advance by the PD controller 40.

Accordingly, two switches BS1 and BS2 are installed on an extension line UCe. The two switches BS1 and BS2 are configured to work together. Both the signal lines CC1 and CC2 are mutually disconnected or are brought into contact with the reference potential line in response to depression of a button of either one of the switches BS1 and BS2.

Figure 13:
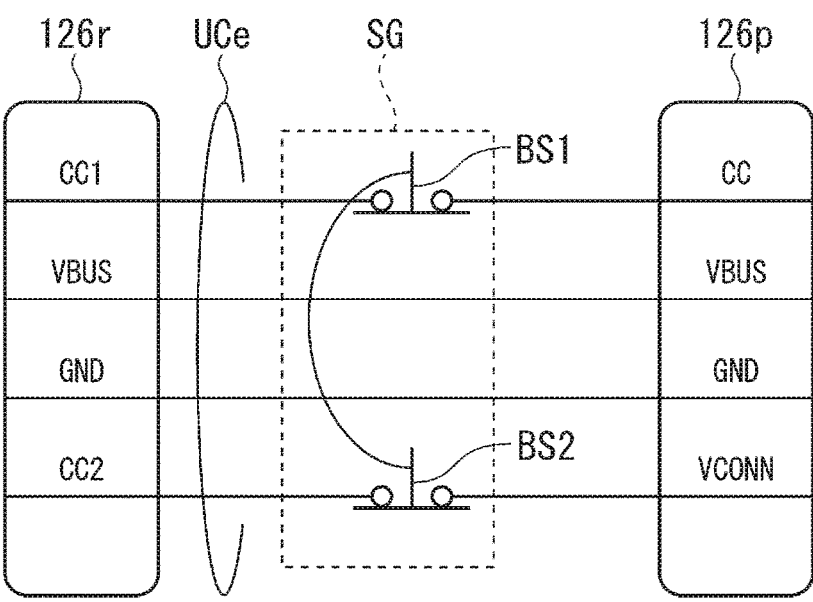
FIG. 13 is a diagram illustrating the third arrangement example of the switch pertaining to one or more embodiments of the present invention.

FIG. 13 is a diagram illustrating the third arrangement example of the switches BS1 and BS2 pertaining to one or more embodiments of the present invention. The switches BS1 and BS2 form one switch group SG. An extension line UCe includes two CC signal lines CC1 and CC2, the power source line VBUS and the reference potential line GND. The switches BS1 and BS2 include buttons and sections respectively. The respective buttons of the switches BS1 and BS2 are linked together by using a support material. Accordingly, the both buttons move by depression of the support material or one of the buttons. Respective sections of the CC signal lines CC1 and CC2 are detached and the CC signal lines CC1 and CC2 are opened owing to movement of the both buttons. Therefore, the potential of the CC signal line of the connector 26c of the electronic apparatus 1 is lowered to 0V. In a case where depression of the support material or the button is released, the CC signal lines CC1 and CC2 conduct with their own sections. Since the CC signal lines CC1 and CC2 conduct with their own sections, the potential of the CC signal line of the connector 26c of the electronic apparatus 1 reaches a positive value which is significantly higher than 0V.

Figure 14:
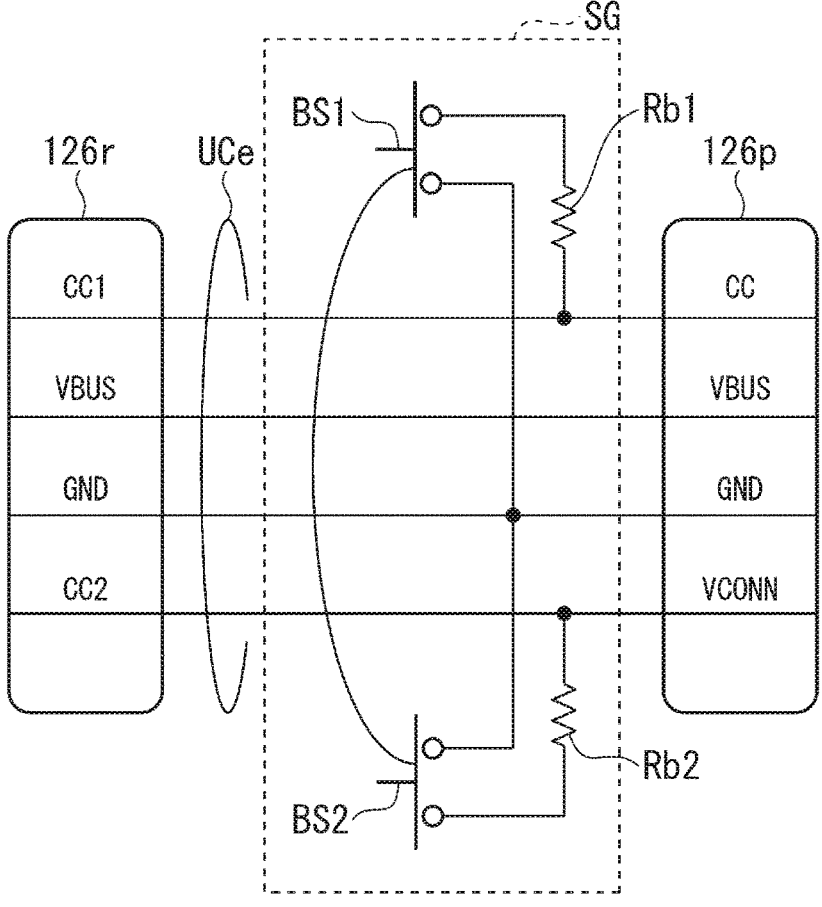
FIG. 14 is a diagram illustrating the fourth arrangement example of the switch pertaining to one or more embodiments of the present invention.

FIG. 14 is a diagram illustrating the fourth arrangement example of the switches BS1 and BS2 pertaining to one or more embodiments of the present invention. One end of the section of the switch BS1 is connected to the CC signal line CC1 by using a resistive element Rb1 and one end of the section of the switch BS2 is connected to the CC signal line CC2 by using a resistive element Rb2. Both the other ends of the respective sections of the switches BS1 and BS2 are connected to the reference potential line GND. Accordingly, the both buttons move by depression of the support material or one of the buttons. Owing to movement of the both buttons, the CC signal lines CC1 and CC2 short-circuit the reference electric potential line GND via the sections respectively. Accordingly, the potentials of the CC signal lines CC1 and CC2 of the connector 26c of the electronic apparatus 1 are lowered to 0V. In a case where depression of the support material or the button is released, the respective sections are separated from the CC signal lines CC1 and CC2. Since the CC signal lines CC1 and CC2 are insulated from the reference potential line GND respectively, the potentials of the CC signal lines CC1 and CC2 of the connector 26c of the electronic apparatus 1 reach positive values which are significantly higher than 0V.

Although in the above description, a case where the electronic apparatus 1 is a laptop PC is mainly explained, the electronic apparatus 1 is not limited to the laptop PC and may be also configured as one of general-purpose information apparatuses of other forms such as a tablet terminal device, a cell phone and so forth and may be also configured as an apparatus which has a specific function as a main function such as a projector main body and so forth. In particular, in a case where the electronic apparatus 1 has a form that one part of the chassis shields the power source button 36 when not used and the power source button 36 is exposed to the outside without being shielded by the chassis when used, this configuration is useful. For example, the electronic apparatus 1 may include a slide mechanism (not illustrated) which makes the first chassis 101 movable in parallel with the second chassis 105 in place of the hinge mechanism so as to operate in a state that the power source button 36 is not covered with the first chassis 101 and is exposed to the outside.

Although, in the above description, a case where the connectors 26c, 126, 126p, 126r, the transmission line UC and the extension line Uce input and output various signals and the electric power in accordance with the USB Type-C is exemplified, the present invention is not limited thereto. The electronic apparatus 1 according to one or more embodiments may be also of the type which follows other input/output systems, the standard which follows the USB Type-C or the standard which is similar to the USB Type-C. In addition, the switches BS, BS1 and BS2 which relate to disconnection of the CC signal line may be of the types which are based on other operating principles such as electromagnetic switches, not limited to mechanical switches. In addition, the operations of the switches BS1 and BS2 may be realized by using an electric circuit, not limited to the mechanical method which uses the support material.

As described above, the electronic apparatus 1 according to one or more embodiments of the present invention includes the host system, the controller (for example, the PD controller 40) and the connector (for example, the connector 26c) which is connectable with the DC power source (for example, the AC adapter 136) by using the transmission line (for example, the transmission line UC). The transmission line has the power source line (for example, the power source line VBUS) and the signal line (for example, the CC signal line) and includes the switch (for example, the switch BS) which disconnects the signal line or makes the signal line connectable to the reference electric potential line (for example, the reference potential line GND). The controller monitors the potential of the signal line and, in case of detection of re-connection of the signal line which is performed on the basis of the monitored potential, controls to boot the host system.

According to this configuration, in a case where the connection state of the signal lines fluctuates by a simple switching operation and reconnection of the signal line is detected on the basis of the potential of the signal line, it becomes possible to boot the host system of the electronic apparatus 1 with no addition of specific equipment. Accordingly, it becomes possible to boot the electronic apparatus 1 conveniently and economically.

After detection of temporal disconnection of the signal line on the basis of the potential of the signal line, the controller may restart power supply to the DC current source.

According to this configuration, after temporal signal line disconnection, it becomes possible to supply the electric power which is required for the operation of the DC power source to the electronic apparatus 1 after temporal disconnection of the signal line.

In a case where the controller detects connection of the signal line on the basis of the potential of the signal line and detects stop of power supply on the basis of the potential of the power source line, the controller may control to restart the power supply to the DC power source. According to this configuration, in a case where the signal lines are reconnected together after execution of the switching operation and the electric power is not supplied from the DC power source, it becomes possible to make the DC power source supply the electric power which is required for the operation to the electronic apparatus 1.

The transmission line may include the first transmission line and the second transmission line, one end of the first transmission line may be connected to the DC power source, the other end of the first transmission line may be made connectable to one end of the second transmission line, the other end of the second transmission line may be made connectable to the connecter and the second transmission line may include the switch.

According to this configuration, the first transmission line which is directly connected to the DC power source and the connector of the electronic apparatus 1 are connected together by using the second transmission line which includes the switch. Accordingly, it becomes possible to boot the electronic apparatus 1 on the basis of the operation on the switch that the second transmission line includes while utilizing the existing first transmission line.

The signal line includes the first signal line (for example, the CC signal line CC1) and the second signal line (for example, the CC signal line CC2), the switch disconnects the first signal line and the second signal line or makes it possible to connect the first signal line and the second signal to the reference electric potential line and the controller monitors the potentials of the first signal line and the second signal line and decides whether either one of the first signal line and the second signal line is reconnected on the basis of the potential which is known and acquired by monitoring.

According to this configuration, it becomes possible to disconnect both of the first signal line and the second signal line or to make them connectable to the reference electric potential line by the switching operation. On the other hand, whether the first and second signal lines are reconnected again is decided on the basis of the potential of either one of the first signal line and the second signal line. Even in a case where one of the first and second signal lines is utilized and the other of them is not utilized, it becomes possible to surely decide whether the first and second signal lines are reconnected again.

One end of the second transmission line includes the first connector (for example, the connector 126r) which fits together with the other end of the first transmission line and the other end of the second transmission line includes the second connector (for example, the connector 126p) which fits together with the connector that the electronic apparatus 1 includes and the first connector and the second connector include the first terminals (for example, CC1, CC) which each terminates the first signal line and the second terminals (for example, CC2, VCONN) which each terminates the second signal line at rotationally symmetric positions.

According to this configuration, even in a case of connection with another connecter to which the orientation of one of the first connector and the second connector opposes to a rotationally symmetric orientation, it becomes possible to electrically connect at least one of the first signal line and the second signal line of the first transmission line to the electronic apparatus 1.

As above, although one or more embodiments of the present invention has been described in detail with reference to the drawings, the concrete configuration is not limited to the above-described one or more embodiments and also designs and so forth which fall within a range which does not deviate from the gist of the present invention are included. It is possible to arbitrarily combine together the respective configurations which are described in the above one or more embodiments.

DESCRIPTION OF SYMBOLS

1 electronic apparatus
11 processor
12 main memory
13 video subsystem
14 display
21 IO controller
22 BIOS memory
23 auxiliary storage
24 audio system
25 WLAN card
26 USB adapter
26c, 126, 126p, 126r connector
31 EC
32 input unit
32k keyboard
32t touch pad
33 power source circuit
34 battery
36 power source button
40 PD controller
121a, 121b hinge mechanism
136 AC adapter
BS, BS1, BS2 switch
CC, CC1, CC2 CC signal line
VBUS power source line
GND reference potential line
UC transmission line
UCe extension line

What is claimed is:

1. An electronic apparatus comprising:
a host system;
a controller;
a transmission line comprising a power source line configured to supply power and a signal line configured to receive control information; and
a Universal Serial Bus (USB) connector which is connectable with a DC power source by using the transmission line, wherein the transmission line includes a switch which disconnects the signal line or makes the signal line connectable to a reference potential line, and the controller monitors potential of the signal line by the USB connector, detects reconnection of the signal line based on the potential, and then boots the host system.

2. The electronic apparatus according to claim 1, wherein the controller detects temporal disconnection of the signal line based on the potential of the signal line and then restarts power supply to the DC power source.

3. The electronic apparatus according to claim 1, wherein the controller detects connection of the signal line based on the potential of the signal line, detects a power outage based on the potential of the DC power source, and then makes the DC power source to restart power supply.

4. The electronic apparatus according to claim 2, wherein the transmission line includes a first transmission line and a second transmission line, one end of the first transmission line is connected to the DC power source, another end of the first transmission line is made connectable to one end of the second transmission line, another end of the second transmission line is made connectable to the USB connector and the second transmission line includes the switch.

5. The electronic apparatus according to claim 4, wherein the signal line includes a first signal line and a second signal line, the switch disconnects the first signal line and the second signal line or makes the first signal line and the second signal line connectable to the reference potential line, the controller monitors potentials of the first signal line and the second signal line and decides whether either one of the first signal line and the second signal line is reconnected based on the potentials.

6. The electronic apparatus according to claim 5, wherein one end of the second transmission line includes a first connector which fits together with another end of the first transmission line, another end of the second transmission line includes a second connector which fits together with the USB connector, and each of the first connector and the second connector includes a first terminal which terminates the first signal line and a second terminal which terminates the second signal line at rotationally symmetric positions.

7. A controlling method in an electronic apparatus which includes a host system, a controller, a transmission line comprising a power source line configured to supply power and a signal line configured to receive control information, and a Universal Serial Bus (USB) connector which is made connectable with a DC power source by using the transmission line and includes a switch which disconnects the signal line or makes the signal line connectable to a reference potential line comprising:

monitoring potential of the signal line by the USB connector;

detecting reconnection of the signal line based on the potential; and thereby booting the host system.

\* \* \* \* \*